United States Patent
Ruβe et al.

(10) Patent No.: US 9,470,171 B2
(45) Date of Patent: Oct. 18, 2016

(54) METHOD FOR DETERMINING A POSITION OF A LOCK ELEMENT OF AN INJECTION VALVE FOR AN INTERNAL COMBUSTION ENGINE

(75) Inventors: Peter Matthias Ruβe, Tegernheim (DE); Robert Hoffman, Ruhstorf/Rott (DE); Steffen Lehner, Eichstatt (DE); Hans-Jörg Wiehoff, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 522 days.

(21) Appl. No.: 14/117,055

(22) PCT Filed: Mar. 19, 2012

(86) PCT No.: PCT/EP2012/054775
§ 371 (c)(1),
(2), (4) Date: Jul. 22, 2014

(87) PCT Pub. No.: WO2012/152485
PCT Pub. Date: Nov. 15, 2012

(65) Prior Publication Data
US 2014/0326218 A1    Nov. 6, 2014

(30) Foreign Application Priority Data
May 12, 2011  (DE) .................. 10 2011 075 750

(51) Int. Cl.
*F02D 41/30*     (2006.01)
*F02M 65/00*     (2006.01)
(Continued)

(52) U.S. Cl.
CPC ....... *F02D 41/3005* (2013.01); *F02D 41/2096* (2013.01); *F02D 41/40* (2013.01);
(Continued)

(58) Field of Classification Search
CPC ........ F02D 41/00; F02D 41/30; F02D 41/20; F02D 41/40; F02D 41/3005; F02D 41/2096; F02D 41/2055; F02M 65/00; F02M 65/005; F02M 51/0603; Y02T 10/44
See application file for complete search history.

(56) References Cited

U.S. PATENT DOCUMENTS

| 4,459,963 A * | 7/1984 | Gross ................... F02M 59/366 |
| | | 123/338 |
| 6,253,736 B1 | 7/2001 | Crofts et al. .................. 123/498 |

(Continued)

FOREIGN PATENT DOCUMENTS

| CN | 101558228 A | 10/2009 | ............. F02D 41/20 |
| CN | 101560935 A | 10/2009 | ............. F02M 61/18 |

(Continued)

OTHER PUBLICATIONS

International Search Report and Written Opinion, Application No. PCT/EP2012/054775, 16 pages, May 7, 2012.

(Continued)

*Primary Examiner* — Hieu T Vo
(74) *Attorney, Agent, or Firm* — Slayden Grubert Beard PLLC

(57) ABSTRACT

A method for determining a position of a lock element of an injection valve for an internal combustion engine includes moving the lock element in the direction of a locked position in a closing movement in order to lock the injection valve, subsequently measuring a closure time at which the lock element arrives in the locked position, determining a time difference between the closure time and a preceding starting time of the closing movement, and determining, based on the time difference, a position which the lock element has assumed at the starting time of the closing movement.

14 Claims, 2 Drawing Sheets

(51) Int. Cl.
  *F02D 41/20* (2006.01)
  *F02D 41/40* (2006.01)
  *F02M 51/06* (2006.01)

(52) U.S. Cl.
  CPC ....... *F02M51/0603* (2013.01); *F02M 65/005* (2013.01); *F02D 2041/2055* (2013.01); *F02M 2200/245* (2013.01); *Y02T 10/44* (2013.01)

(56) References Cited

U.S. PATENT DOCUMENTS

| | | | |
|---|---|---|---|
| 7,505,846 B2 | 3/2009 | Stoecklein et al. | 701/105 |
| 7,793,640 B2 * | 9/2010 | Fach | F02D 41/1456 123/479 |
| 8,061,632 B2 | 11/2011 | Petrecchia et al. | 239/585.3 |
| 8,082,903 B2 | 12/2011 | Lehr et al. | 123/490 |
| 8,113,176 B2 * | 2/2012 | Rossignol | F02M 47/027 123/467 |
| 2006/0082252 A1 | 4/2006 | Allmendinger et al. | 310/316.03 |
| 2010/0094527 A1 | 4/2010 | Futonagane et al. | 701/103 |
| 2012/0116702 A1 | 5/2012 | Beer et al. | 702/65 |

FOREIGN PATENT DOCUMENTS

| | | | |
|---|---|---|---|
| CN | 101568718 A | 10/2009 | ............. F02M 45/08 |
| DE | 102004023545 A1 | 12/2005 | ............. F02D 41/20 |
| DE | 102006003486 A1 * | 7/2007 | ......... F02M 51/0603 |
| DE | 102009032521 A1 | 1/2011 | ............. F02D 41/20 |
| EP | 1760305 A1 | 3/2007 | ............. F02M 51/06 |
| WO | 2006/076992 A1 | 7/2006 | ............. F02D 41/20 |
| WO | 2012/152485 A1 | 11/2012 | ............. F02D 41/20 |

OTHER PUBLICATIONS

Chinese Office Action, Application No. 201280022939.7, 12 pages, May 5, 2015.

* cited by examiner

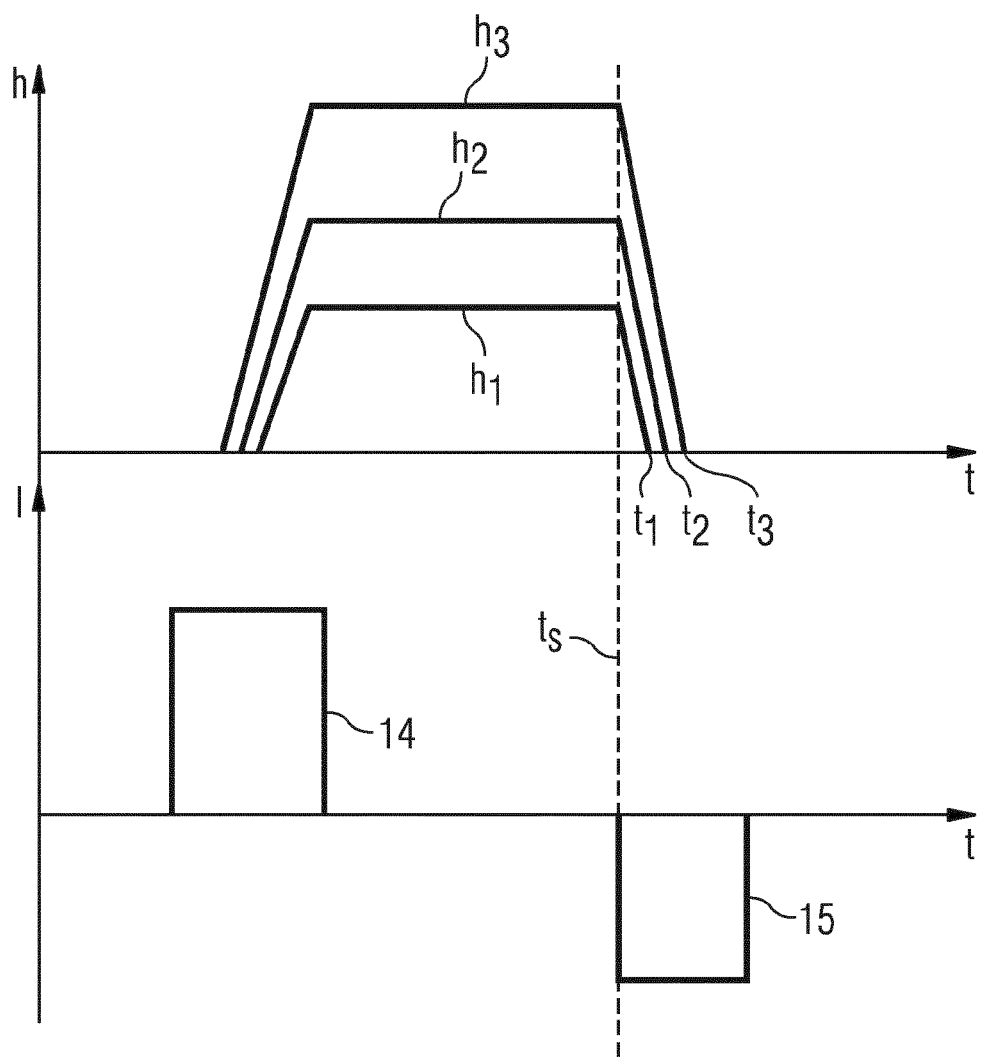

METHOD FOR DETERMINING A POSITION OF A LOCK ELEMENT OF AN INJECTION VALVE FOR AN INTERNAL COMBUSTION ENGINE

CROSS-REFERENCE TO RELATED APPLICATIONS

This application is a U.S. National Stage Application of International Application No. PCT/EP2012/054775 filed Mar. 19, 2012, which designates the United States of America, and claims priority to DE Application No. 10 2011 075 750.3 filed May 12, 2011, the contents of which are hereby incorporated by reference in their entirety.

TECHNICAL FIELD

The invention relates to a method for determining a position of a blocking element of an injection valve for an internal combustion engine, and to an injection system for injecting a fuel into an internal combustion engine.

BACKGROUND

Injection systems, such as common-rail injection systems for example, are used to inject fuel into an internal combustion engine, for example into a diesel engine or into a spark-ignition engine of a vehicle. To this end, an injection system has, as is known, one or more injection valves which can be actuated by means of a control unit of the injection system in order to inject the fuel. An injection valve, often also called an injector, has a blocking element, which can be moved by means of a drive of the injection valve, in order to open and close the injection valve. If the blocking element is in a blocking position, the injector is closed and no fuel will be injected. If the blocking element is not in the blocking position, the injector is partially or completely open and fuel will be injected. The injector usually has one or more injection openings through which the fuel will be injected and which, to this end, can be partially or completely unblocked or closed by means of the blocking element.

In order to minimize exhaust gas and noise emissions and in order to achieve a level of energy efficiency which is as high as possible, it is important for it to be possible for injection quantities of the fuel to be metered in as accurate a manner as possible and for the time points of the injection operations to be controlled in an accurate a manner as possible. In particular, it is known that an injection operation can comprise one or more individual injection operations, such as a main injection operation and further pre- and/or post-injection operations. Therefore, a non-trivial injection rate profile of an injection operation over time can be achieved by using a plurality of individual injection operations. An injection rate is to be understood to mean the quantity of fuel injected per unit time.

To this end, provision is often made for the injection valve to not open completely but rather only partially, that is to say for a reduced degree of opening of the injection valve to be set. In order to partially open the injection valve, the blocking element is not moved away from the blocking position as far as a mechanical stop, but rather, for example, only until some, but not all, of a plurality of injection openings are unblocked. This is possible, for example, when the injector is a so-called "variable nozzle", the injection holes of said variable nozzle being arranged in different planes ("levels"). A reduced degree of opening can also be achieved by a throttling effect of the blocking element, said throttling effect being all the greater the closer the blocking element is to its blocking position. If the blocking element of the injection valve has a nozzle needle for blocking one or more injection openings, a reduced degree of opening of the injection valve can therefore be achieved by the nozzle needle not being lifted completely and out of the blocking position as far as a stop of the nozzle needle, that is to say as far as a maximum needle stroke of the nozzle needle, but rather that said nozzle needle is lifted only as far as a reduced needle stroke.

In addition to the described process of forming the time profile of injection rate, it is also advantageous to know the position of the blocking element for vehicle diagnosis operations ("on-board diagnostics") by means of an engine controller or an "on-board unit" ("OBU"). Therefore, injectors which have, for example, failed, are always closed or are always open can be diagnosed, for example an electrical defect in one of the injectors of the injection system can be diagnosed. Information relating to the position of the blocking element can also be used to draw conclusions about the injection rate and injection quantity and therefore about various properties of the internal combustion engine and possibly also of a vehicle which is driven by said internal combustion engine.

In principle, the position of the blocking element and therefore the degree of opening of the injection valve can be detected by means of an additional sensor. Therefore, it is known, for example, to arrange a specific needle stroke sensor on the nozzle needle of an injector and to directly measure the needle stroke of the nozzle needle using this additional sensor. However, this leads to higher production costs for the injection valve. The only way that is known from the prior art to achieve this without an additional sensor is to measure the position of the blocking element at the time at which it reaches the blocking position, that is to say only during the so-called closing or blocking time point of the injection valve, as described in documents DE 10 2009 032 521 A1 and DE 10 2004 023 545 A1 for example.

However, this information on its own is not sufficient to allow a conclusion to be drawn about the degree of opening of the valve during the injection operation, that is to say before the closing time point.

SUMMARY

One embodiment provides a method for determining a position of a blocking element of an injection valve for an internal combustion engine, in which method, in order to block the injection valve, the blocking element is made to perform a closing movement in the direction of a blocking position, and a closing time point at which the blocking element reaches the blocking position is then measured, wherein a time difference between the closing time point and a preceding starting time point of the closing movement is determined and a position which the blocking element had assumed at the starting time point of the closing movement is determined using the time difference.

In a further embodiment, said position is determined by means of movement compensation of the blocking element on the basis of the time difference, or in that said position is read out from a characteristic diagram of the injection valve on the basis of the time difference.

In a further embodiment, the blocking element is made to perform the closing movement by means of a piezo element.

In a further embodiment, the blocking element is directly driven by the piezo element.

In a further embodiment, the situation of the blocking element reaching the blocking position is detected by the same piezo element.

In a further embodiment, the blocking element has a nozzle needle.

In a further embodiment, in order to partially or completely open the injection valve for a single injection operation, the blocking element is made to perform a reciprocating movement by means of a drive pulse which is transmitted to the blocking element, wherein, in order to achieve a specific stroke height of the blocking element, the drive pulse is determined using the position which the blocking element had assumed at the starting time point of the preceding closing movement during an earlier individual injection operation.

Another embodiment provides an injection system for injecting fuel into an internal combustion engine, having a control unit and at least one injection valve which has a blocking element for blocking the injection valve, a drive for the blocking element and a sensor, wherein the sensor is designed to respond to a situation of the blocking element reaching a blocking position and to generate a corresponding signal, wherein the control unit is designed to actuate the drive in order to initiate a closing movement of the blocking element in the direction of the blocking position and to determine a closing time point, at which the blocking element of the at least one injection valve enters the blocking position, on the basis of the signal from the sensor, wherein the control unit is designed to determine a time difference between the closing time point and a preceding starting time point of the closing movement and to determine a position which the blocking element had assumed at the starting time point of the closing movement using the time difference.

In a further embodiment, the control unit is designed to determine said position by means of an equation of motion of the blocking element on the basis of the time difference, or to read out said position from a characteristic diagram of the injection valve on the basis of the time difference.

In a further embodiment, the drive has a piezo actuator.

In a further embodiment, there is a substantially rigid connection between the drive and the blocking element for direct transmission of force between the drive and the blocking element.

In a further embodiment, the sensor is provided by the piezo actuator of the drive.

In a further embodiment, the blocking element has a nozzle needle.

In a further embodiment, the control unit is designed to actuate the drive in order to transmit a drive pulse to the blocking element in order to initiate a reciprocating movement of the blocking element and in order to partially or completely open the injection valve for a single injection operation, wherein the control device is designed, in order to achieve a specific stroke height of the blocking element, to determine the drive pulse using the position which the blocking element had assumed at the starting time point of one of the preceding closing movements during an earlier single injection operation.

BRIEF DESCRIPTION OF THE DRAWINGS

An example embodiment of the invention is explained in greater detail below with reference to the drawings, in which:

FIG. 2 shows the time profile of a reciprocating movement and a closing movement of a closing element of the injector which is shown in FIG. 1.

DETAILED DESCRIPTION

Figure 1:
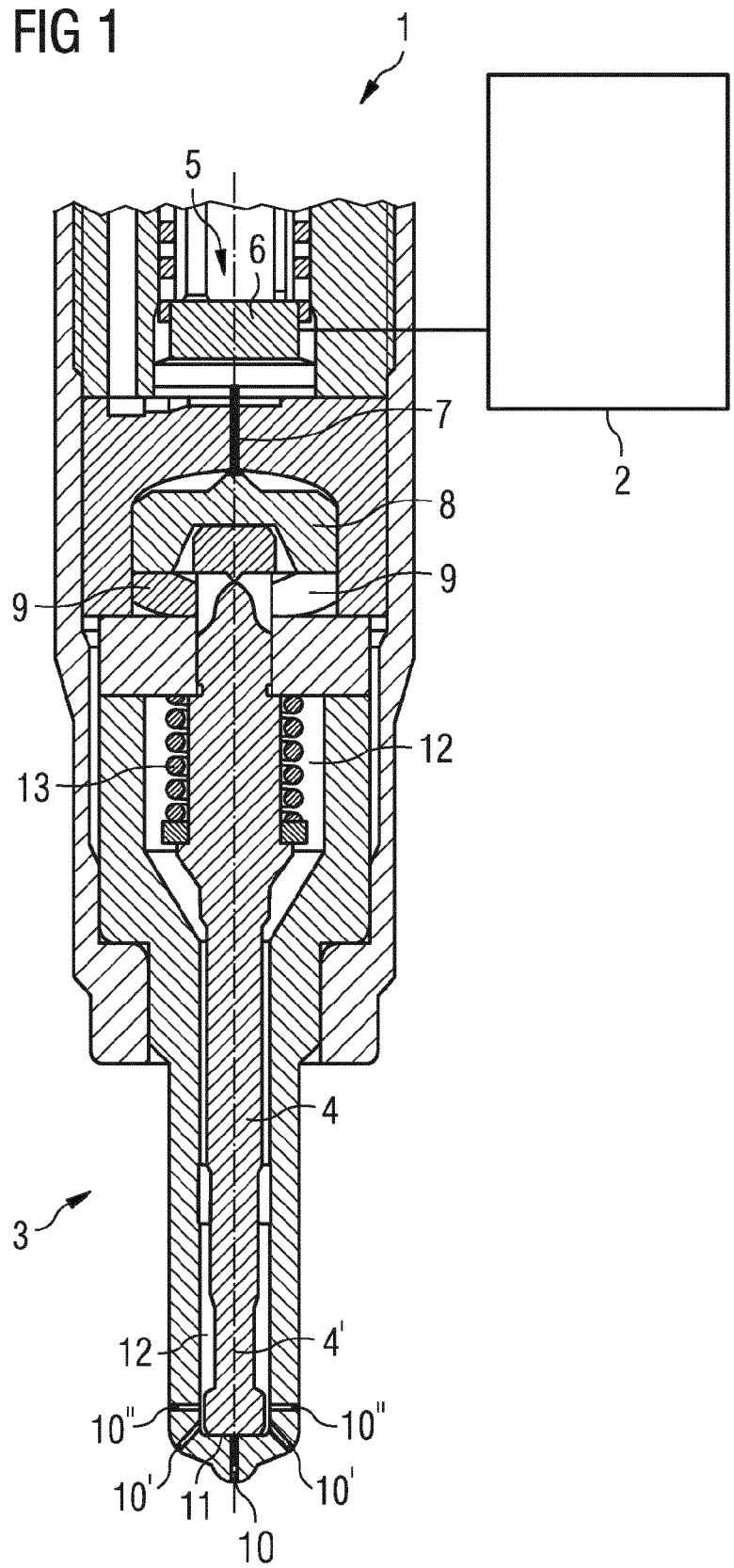
FIG. 1 shows an injection system of the kind proposed in this document.

Embodiments of the present invention provide a method which allows the position of a blocking element of an injection valve to be determined in as accurate a manner as possible during an injection process. An associated aim is for this method to be carried out using an injection valve which can be produced in as cost-effective a manner as possible. A further aim is to propose an injection system which is as cost-effective as possible and which is designed to carry out a method of this kind, that is to say which can also be used to determine the position of a blocking element of an injection valve of the injection system during an injection process.

The method for determining a position of a blocking element of an injection valve for an internal combustion engine therefore provides that, in order to block the injection valve, the blocking element is made to perform a closing movement in the direction of a blocking position, and a closing time point at which the blocking element reaches the blocking position is then measured. A time difference between the closing time point and a preceding starting time point of the closing movement is determined and a position which the blocking element had assumed at the starting time point of the closing movement is determined using the time difference.

At least some embodiments are therefore based on the knowledge that there is a clear relationship between the position of the blocking element at the starting time point of the closing movement, that is to say during an injection process of the injection valve, and said time difference. The greater this time difference, the longer the distance which the blocking element has to cover in order to reach the closed position starting from the starting time point has to be. Therefore, this time difference is already suitable on its own as a clear measure of the position of the blocking element at the starting time point of the closing movement.

Consequently, the term "position" is also intended to designate any measurement variable which is suitable as a measure of the position which is determined as disclosed herein, that is to say said time difference itself or else a stroke height (also called stroke for short) which is defined as the distance between the position of the blocking element at the starting time point of the closing movement and the blocking position.

Corresponding actuation of the drive for initiating the closing movement can be used as the starting time point of the closing movement.

The stroke height can be determined from said time difference, for example, by means of an equation of motion of the blocking element, said time difference being inserted into said equation of motion. This equation of motion may be, for example, a Newtonian equation of motion (integrated with respect to time) in which a mass of the blocking element and also further forces which act on the blocking element, such as drive forces or the drive pulse of the drive, spring forces, compression forces and friction forces for example, are included. Further measurement variables, such as a pressure and/or a viscosity of the fuel, a temperature of the fuel and/or of the injector for example, can be incorporated into the equation of motion.

Provision can also be made for the stroke height to be read out from a corresponding characteristic diagram of the injection valve on the basis of the time difference defined above, wherein values of time differences are plotted along a first axis of the characteristic diagram and associated values of the stroke height are plotted along a further axis. A pressure and/or a viscosity of the fuel, a temperature of the fuel and/or of the injector and also a drive pulse, for example, can be plotted along further axes of the characteristic diagram, wherein the drive pulse is transmitted to the blocking element in order to initiate a reciprocating movement or a closing movement by means of the drive.

The term "drive pulse" is also intended to designate, in general, variables which constitute a measure of the intensity or strength with which the blocking element is made to perform a reciprocating movement or closing movement. If the drive has, for example, a piezo actuator as the actuator, as is described in greater detail further below, said drive pulse may be an electrical pulse or an electrical charging energy, an electrical discharging or charging voltage, an electrical discharging or charging current, which pulse, energy, voltage or current is transmitted to the blocking element by the piezo element in the form of a mechanical pulse or force impulse or in the form of kinetic energy.

Embodiments of the invention are also based on the understanding that in most application cases it is entirely adequate to determine the position of the blocking element at the starting time point of the closing movement, that is to say the correspondingly defined stroke height, since the blocking element is generally held in a substantially unchanged holding position during a holding phase which lasts until said starting time point, in order to ensure a degree of opening of the injection valve which is as constant as possible during this holding phase.

In a further embodiment of the method, provision is made for the blocking element to be made to perform a closing movement or a reciprocating movement by means of a piezo element. In this case, the drive therefore comprises an actuator which is designed as a piezo element and is also called a piezo actuator for short. The piezo actuator typically has a stack of piezoelectric crystals. However it is also possible, in principle, for the closing element to be moved by means of an electromagnetic actuator, magnetic actuator for short.

The blocking element of the injector is preferably driven directly and substantially without a delay by the actuator of the drive, that is to say the abovementioned piezo actuator for example, that is to say forces between the actuator and the blocking element are transmitted directly and substantially without a delay. The actuator which therefore acts on the blocking element directly and substantially without a delay therefore allows particularly accurate positioning of the blocking element and design of the injection rate profile. In this case, the transmission of force between the actuator and the blocking element is transmitted exclusively by means of substantially rigid components. In particular, a hydraulic section is dispensed with in the force transmission between the drive and the blocking element, in particular the use of a so-called servo valve between the actuator and the blocking element. Injection valves with actuators which act directly on the blocking element are often also called "directly driven injectors" and are known, for example, from document EP 1 760 305 A1, the disclosure content of this document hereby being fully incorporated.

In one embodiment of the method, provision is made for the situation of the blocking element reaching the blocking position to be detected by the actuator of the drive. In this case, the actuator of the drive is therefore also used as a sensor. This makes use of a mechanical pulse or response being transmitted from the blocking element back to the actuator, said pulse or response acting on the actuator, when the blocking element arrives. In order to transmit this response or pulse, the above-described direct transmission of force between the actuator and the blocking element is again particularly advantageous since it hardly weakens the response or pulse and is only slightly delayed and therefore can be detected by the actuator in a particularly reliable and accurate manner.

If the actuator is provided, for example, by a piezo actuator, the piezo actuator at the same time serves as a piezo sensor in this case. Signals, for example in the form of electrical voltage changes or currents across the piezo actuator on the basis of which the closing time point can be determined, are triggered in the piezo actuator as a result of the blocking element reaching the closing position.

However, in principle, an electromagnetic actuator can also be used as a sensor in order to measure the situation of the blocking element reaching the closing position, as described in document DE 10 2009 032 521 A1 for example. However, the situation of the blocking element reaching the closing position can, in principle, also be detected by means of an additional sensor, as has been mentioned in the introductory part. However, this generally leads to higher costs of producing the injector.

In one embodiment of the method, provision is made for the blocking element to have a nozzle needle. In the blocking position, the nozzle needle typically sits on a needle seat of the injection valve. The stroke height of the nozzle needle is frequently also called the needle stroke.

In a further development of the method, provision is made, in order to partially or completely open the injection valve for a single injection operation, for the blocking element to be made to perform a reciprocating movement by means of a drive pulse which is transmitted to the blocking element. In this case, in order to achieve a specific stroke height of the blocking element in as accurate a manner as possible, the drive pulse can be determined using or taking into account the position which the blocking element had assumed at the starting time point of the preceding closing movement during an earlier individual injection operation.

Therefore, provision can be made, for example, for a stroke height of the blocking element which is associated with a prespecified degree of opening to be determined as a function of said degree of opening. This stroke height can be determined, for example, as a function of a desired throttling effect by the blocking element. In the case of a variable nozzle which was described in the introductory part, the stroke height can also be defined by a plane of injection holes in the variable nozzle. The drive pulse which is associated with the desired stroke height is then determined. Provision can be made, for example, for the drive pulse to be read out from an actuation characteristic diagram of the injection valve in which value pairs of drive pulses for reciprocating movements and associated expected stroke heights and/or associated time differences are obtained, wherein these are defined in the manner described above. In addition, the actuation characteristic diagram can have additional axes with further measurement variables, like the characteristic diagrams described above. The additional measurement variables, such as the pressure and/or the temperature of the fuel for example, can likewise be taken into account when ascertaining the drive pulse.

Provision can also be made for a corresponding signal to be generated in the event of deviations between the specific stroke height of the blocking element and a prespecified setpoint value of the stroke height, these deviations exceeding a prespecified threshold value, and said signals being forwarded, for example, to an on-board unit for further processing, for example for on-board diagnostics. As described in the introductory part, deviations of this kind can occur, for example, in the case of there being an electrical defect in the injector.

An injection system for injecting fuel into an internal combustion engine may comprise a control unit and at least one injection valve which has a blocking element for blocking the injection valve, a drive for the blocking element and a sensor. The sensor is designed to respond to a situation of the blocking element reaching a blocking position and to generate a corresponding signal. The control unit is designed to actuate the drive in order to initiate a closing movement of the blocking element in the direction of the blocking position and, on the basis of the signal from the sensor, to determine a closing time point, at which the blocking element of the at least one injection valve reaches the blocking position.

It is important for the injection system that the control unit is also designed to determine a time difference between the closing time point and a preceding starting time point of the closing movement and to determine a position which the blocking element had assumed at the starting time point of the closing movement using this time difference. The injection system is therefore designed to carry out the method proposed in this document. Therefore, all of the manners of operation and advantages explained with respect to the method can accordingly be transferred to the injection system too. This likewise applies to the further developments and special embodiments of the injection system which are described in the text which follows, the manners of operation and advantages of said further developments and special embodiments corresponding to those of the above-described embodiments of the method.

Therefore, in a further development of the injection system, provision is made for the control unit to be designed to determine said position by means of an equation of motion of the blocking element on the basis of the time difference, or for said position to be read out from a characteristic diagram of the injection valve on the basis of the time difference, as has already been described in detail above in connection with the proposed method.

In one embodiment of the system, the drive of the at least one injection nozzle has an actuator which can be provided by a piezo actuator. However, provision is also made for the actuator to be provided by a magnetic actuator. As has already been described above in connection with the proposed method, there is preferably a substantially rigid connection between the drive and the blocking element, in order to achieve direct transmission of force between the drive and the blocking element. In this case, the injector is a so-called directly driven injector.

In a further development, provision is made for the sensor to be provided by the actuator of the drive, that is to say for the sensor to also serve as an actuator of the drive. In the case of the actuator being provided by a piezo actuator, this piezo actuator can, for example, at the same time also perform the function of the sensor, and vice versa. The sensor, which is also called a piezo sensor in this case, and the piezo actuator are therefore realized by the same component in this case.

In a further development, the blocking element has a nozzle needle which preferably sits on a needle seat of the injection valve in the blocking position. Provision can further be made for the at least one injection nozzle to be designed as a variable nozzle, that is to say for said injection nozzle to have a plurality of injection holes which are arranged in different planes. If the blocking element is located at a specific stroke height, the injection holes in planes below this stroke height are open and the injection holes in planes above this stroke height are closed. There is therefore a clear correspondence between the stroke height and the degree of opening of the injection valve in this case.

In a further development, provision is made for the control unit to be designed to actuate the drive in order to transmit a drive pulse to the blocking element in order to initiate a reciprocating movement of the blocking element and in order to partially or completely open the injection valve for a single injection operation. In this case, the control device can be designed to determine the drive pulse, in order to achieve a specific stroke height of the blocking element, using the position which the blocking element had assumed at the starting time point of one of the preceding closing movements during an earlier single injection operation.

The injection system can be designed as a common-rail injection system and have a high-pressure store, the so-called common rail, for the fuel. In order to transmit the fuel from the high-pressure store to the at least one injector, the high-pressure store and the at least one injector are hydraulically connected to one another via one or more high-pressure lines.

An injection system 1 of the kind proposed in this document is schematically illustrated in FIG. 1. The injection system 1 comprises a control unit 2 and a plurality of injection valves, only a single injection valve 3 being illustrated for reasons of clarity. The injection valve 3 has a closure element 4 with a nozzle needle 4' for blocking injection holes 10, 10', 10" of the injection valve 3. The injection valve 3 also comprises a drive 5 for the blocking element 4 and a piezo sensor 6. In a closing position, the nozzle needle 4' sits on a needle seat 11 and blocks the injection holes 10, 10' and 10" which are arranged in three planes which are offset along a longitudinal axis of the injection valve 3. The injection valve is therefore designed as a variable nozzle. Therefore, a specific number of injection holes are opened or closed by the nozzle needle 4', depending on the existing needle stroke. There is therefore a clear relationship between the needle stroke and a degree of opening of the injection valve 3.

The piezo sensor 6 also performs the function of a piezo actuator of the drive 5. The piezo sensor 6 and the piezo actuator of the drive 5 are therefore provided by the same component, and therefore the piezo actuator and the piezo sensor 6 are also called the piezo element 6 in the text which follows. There is a substantially rigid connection between the piezo element 6 and the blocking element 4, said rigid connection being established by means of rigid intermediate elements. The injection nozzle is therefore a directly driven injection nozzle 3 in which force is transmitted between the drive 5 and the blocking element 4 directly and substantially without delay. Said rigid intermediate elements, which ensure said force transmission, are provided by an intermediate pin 7, a bell 8 and a lever arrangement 9. If the piezo element 6 expands, a force is exerted on the blocking element 4 in the direction of the piezo element 6 by means of the intermediate elements. If the piezo element 6 contracts, a force is exerted on the blocking element 6 in the opposite direction, that is to say in the direction of the needle seat 11, by means of the intermediate elements.

The injection valve 3 also has a nozzle space 12 which is hydraulically connected to a high-pressure store (common rail), which is not illustrated here, of the injection system 1. The injection valve 3 also has a closing spring 13 which is designed to compensate a compressive force of the fuel which is contained in the nozzle space 12 and is exerted on the blocking element 4, with the result that only a relatively low force has to be exerted in order for the blocking element 4 to be moved by the piezo element 6.

The piezo element 6 is designed to respond to a situation of the blocking element 4 reaching a blocking position, that is to say to a situation of the nozzle needle 4' striking the needle seat 11, and to generate a corresponding signal. When the nozzle needle 4' strikes the needle seat 11, a response is transmitted to the piezo element 6 on account of the described direct transmission of force between the blocking element 4 and the piezo element 6, said response being converted into an electrical voltage pulse by means of the piezoelectric effect. This pulse is transmitted to the control unit 2 as said signal and is detected and processed further by said control unit. In particular, a closing time point of the injection valve at which the nozzle needle 4' strikes the needle seat 11 is determined on the basis of the signal.

The control unit 2 is also designed to actuate the drive 5 in order to initiate a closing movement of the blocking element in the direction of the blocking position by the piezo element 6 being electrically discharged by an electrical discharge current. This electrical discharge current therefore constitutes a drive pulse which is converted into mechanical energy in a piezoelectric manner by means of the piezo element and is transmitted to the blocking element 4 (by means of the intermediate elements 7, 8, 9), with the result that said blocking element is made to perform the closing movement. The time point at which actuation is performed is stored in the control unit 2 as the starting time point of the closing movement.

The control unit 2 is also designed to determine a time difference between the closing time point and a preceding starting time point of the closing movement and to determine a position which the blocking element 4 had assumed at the starting time point of the closing movement, that is to say a needle stroke of the nozzle needle 4', using this time difference. To this end, the stroke height is read out from a characteristic diagram of the injection valve 3, which injection diagram is stored in the control unit 2, on the basis of this time difference by means of the control unit 2. Values of time differences are plotted along a first axis of the characteristic diagram and associated values of the stroke height (of the needle stroke) are plotted along a second axis. A pressure, a temperature and a viscosity of the fuel and a temperature of the injector are plotted along further axes of the characteristic diagram. Provision is made for these variables to likewise be taken into account by the control unit 2 when ascertaining the stroke height from the measured time difference. The control unit is connected to corresponding sensors (not illustrated) for this purpose.

The control unit 2 could also be designed to calculate the stroke height by means of a Newtonian equation of motion which is integrated with respect to time and into which the time difference is inserted and into which a mass of the blocking element and also forces acting on the blocking element are incorporated, specifically the drive pulse of the drive, the spring force of the spring 13, the compression force of the fuel and the frictional forces are incorporated. The equation of motion also includes further measurement variables, specifically a viscosity of the fuel and also a temperature of the fuel and of the injector 3.

The control unit is also designed to actuate the drive element 6 in order to partially or completely open the injection valve 3 as far as a prespecified stroke height of the nozzle needle 4'. To this end, a drive pulse in the form of an electrical charge current is transmitted to the piezo element 6 by the control unit 2, said drive pulse being transmitted to the blocking element 4 in the form of mechanical kinetic energy in a piezoelectric manner by the piezo element, with the result that the blocking element 4 is made to perform a reciprocating movement. The control unit 2 is designed, before the drive pulse is transmitted to the drive 6, initially as a function of a prespecified degree of opening, to determine a stroke height of the blocking element which is associated with this degree of opening, wherein this stroke height is defined by a plane of injection holes in the variable nozzle, which plane is associated with the desired degree of opening. The drive pulse which is associated with the desired stroke height is then read out from an actuation characteristic diagram of the injection valve 3 which is stored in the control unit 2 and in which value pairs of drive pulses for reciprocating movements and associated expected stroke heights are contained. The actuation characteristic diagram also contains additional axes along which the pressure and the temperature of the fuel are plotted, said pressure and temperature likewise being taken into account by the control unit 2 when ascertaining the drive pulse.

The control unit 2 is finally designed, in the case of a deviation between the determined stroke height of the blocking element 4 and a prespecified setpoint value of the stroke height exceeding a prespecified threshold value, to generate a corresponding signal and to forward said signal to an on-board unit for on-board diagnostics.

FIG. 2 illustrates time profiles of the stroke heights of three different injectors 3 of the injection system 1 which is shown in FIG. 1, and also time profiles of associated drive pulses with which the drives 5 of the injectors 3 have been actuated in order to achieve these profiles of the stroke heights. The labels on the axes have the following meanings: t is the time, I stands for a current intensity, and h stands for the stroke height.

Said figure shows a first drive pulse 14 in the form of an electrical charge current with a positive current intensity, with which the piezo elements 6 of the three said injectors 3 are each charged in order to initiate reciprocating movements of the blocking elements 4 of the injectors 3. Starting at the starting time point $t_s$, a drive pulse 15 in the form of a discharge current with a negative current intensity is generated, the piezo elements 6 of the injectors 3 being discharged by said discharge current, as a result of which the blocking elements 4 of the injectors are each made to perform a closing movement. The three injectors have identical actuation characteristic curves. In order to achieve a prespecified degree of opening of the injectors, the same drive pulse 14 was therefore read out from said actuation characteristic curves in each case. It can now be seen that, even though the piezo elements 6 are each charged with the same drive pulses, that is to say charge currents 14, different stroke heights $h_1$, $h_2$ and $h_3$ are achieved. These differences can be caused, for example, by manufacturing deviations or by wear of the injectors 3.

After the starting time point $t_s$, the blocking elements 4 enter the respective closing positions, that is to say on the respective needle seats 11, at the respective closing time points $t_1$, $t_2$ and $t_3$. It can now be seen that, even though the closing movements are each initiated at the same starting time $t_s$ and by the same drive pulse 15, the blocking element 4 with the highest stroke height $h_3$ occurs at the latest closing time point $t_3$, and the blocking element 4 with the lowest stroke height $h_1$ occurs at the earliest closing time point $t_1$. In general, the time difference between the starting time point and the closing time point increases as the achieved stroke height h increases. Therefore, this time difference is a clear measure for ascertaining and also for indicating the stroke height of the blocking element 4.

In the example shown, the stroke height $h_2$ corresponds to the desired degree of opening.

What is claimed is:

1. An injection system for injecting fuel into an internal combustion engine, the injection system comprising:
   a control unit and
   at least one injection valve comprising:
      a blocking element for blocking the injection valve,
      a drive for the blocking element, and
      a sensor configured to:
         respond to a situation of the blocking element reaching a blocking position, and
         generate a corresponding signal,
   wherein the control unit is configured to:
      actuate the drive to initiate a closing movement of the blocking element in the direction of the blocking position,
      determine, based on the signal from the sensor, a closing time point at which the blocking element of the at least one injection valve enters the blocking position,
      determine a time difference between the closing time point and a preceding starting time point of the closing movement, and
      determine a position which the blocking element had assumed at the starting time point of the closing movement based on the time difference.

2. The system of claim 1, wherein the control unit is configured to determine said position using an equation of motion of the blocking element based on the time difference, or to read out said position from a characteristic diagram of the injection valve based on the time difference.

3. The system of claim 1, wherein the drive has a piezo actuator.

4. The system of claim 1, comprising a substantially rigid connection between the drive and the blocking element for direct transmission of force between the drive and the blocking element.

5. The system at claim 1, wherein the sensor is provided by the piezo actuator of the drive.

6. The system of claim 1, wherein the blocking element has a nozzle needle.

7. The system of claim 1, wherein the control unit is configured to:
   actuate the drive to transmit a drive pulse to the blocking element to initiate a reciprocating movement of the blocking element and in order to partially or completely open the injection valve for a single injection operation, and
   in order to achieve a specific stroke height of the blocking element, determine the drive pulse using the position which the blocking element had assumed at the starting time point of one of the preceding closing movements during an earlier single injection operation.

8. A method for determining a position of a blocking element of an injection valve for an internal combustion engine, comprising:
   causing the blocking element to perform a closing movement in the direction of a blocking position, in order to block the injection valve,
   measuring a closing time point at which the blocking element reaches the blocking position,
   determining a time difference between the closing time point and a preceding starting time point of the closing movement, and
   determining, based on the time difference, a position which the blocking element had assumed at the starting time point of the closing movement.

9. The method claim 8, wherein said position is determined by movement compensation of the blocking element based on the time difference, or said position is read out from a characteristic diagram of the injection valve based on the time difference.

10. The method claim 9, wherein a piezo element causes the blocking element to perform the closing movement.

11. The method of claim 10, wherein the blocking element is directly driven by the piezo element.

12. The method of claim 10, wherein the situation of the blocking element reaching the blocking position is detected by the same piezo element.

13. The method of claim 8, wherein the blocking element has a nozzle needle.

14. The method of claim 8, comprising transmitting a drive pulse to the blocking element to cause the blocking element to perform a reciprocating movement, in order to partially or completely open the injection valve for a single injection operation,
   wherein, in order to achieve a specific stroke height of the blocking element, the drive pulse is determined using the position which the blocking element had assumed at the starting time point of the preceding closing movement during an earlier individual injection operation.

* * * * *